United States Patent Office.

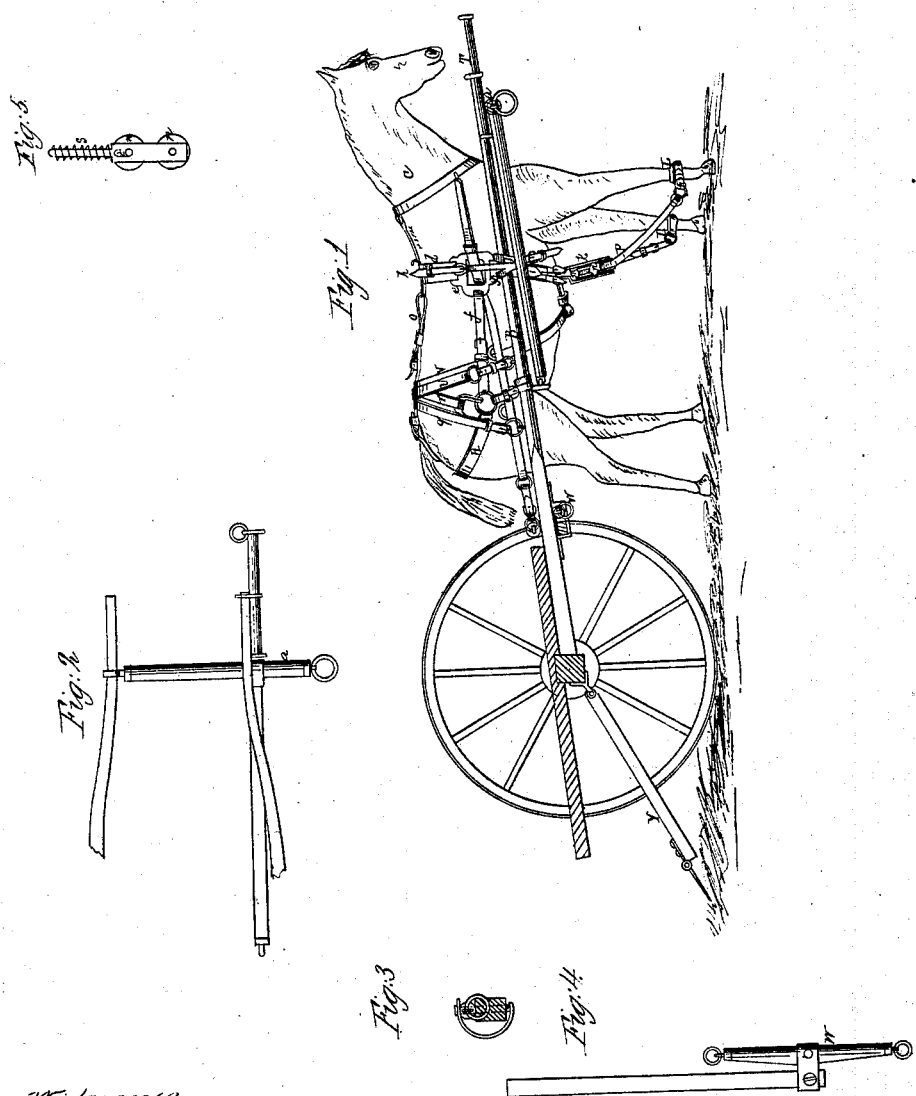

COMMODORE DANIELS, OF FREMONT, OHIO.

Letters Patent No. 62,257, dated February 19, 1867.

---

IMPROVEMENT IN HARNESS.

---

*The Schedule referred to in these Letters Patent and making part of the same.*

---

TO ALL WHOM IT MAY CONCERN:

Be it known that I, COMMODORE DANIELS, of Fremont, Sandusky county, Ohio, have invented certain new and useful improvements in Apparatus for Breaking Restive Horses; and I hereby declare that the following is a true, full, and exact description of the same, reference being had to the accompanying drawings, and to the letters of reference marked thereon. In the drawings annexed, which make a part of this specification—

Figure 1 represents a side elevation of a two-wheel vehicle, and a horse attached to it.

Figure 2 is a plan view of the neck-yoke, with its attachment.

Letter A, in fig. 1, represents a two-wheeled vehicle, with shafts B attached to it. In order to explain more fully the position and utility of the different parts of my improved harness, I present the figure of a horse, C, with my break harness on him, and each strap so distinctly marked as to enable any one to use my improvement. The letter $d$, fig. 1, represents the saddle. To each of the saddle skirts is fastened the metal plate $e$, having an opening in its centre, through which the trace is made to pass, and also three oblong loop holes near its circumference—one for receiving the saddle skirt, as above mentioned, another for receiving the breach-band $f$, and the lower one for receiving the belly-band $g$. $h$ designates a strap, the upper end of which is buckled to the saddle $d$, and the lower end fastened to loop $j$, through which the shaft B passes. $k$ represents a frame, containing the two pulleys $m$ and $n$. The upper end of frame $k$ is firmly secured to the belly-band $g$. As the pulley $m$ has its axle working in the oblong slot $t$, (see fig. 5,) its position will be regulated by the spiral springs $s$. P represents a leather strap passing over pulley $n$, and having its lower ends buckled to the two bands L, which embrace the fore legs of the horse. The straps L are stuffed with any suitable material, to prevent their injuring the horse's legs, and are secured to their place by a strap and buckle. The object of this arrangement is to prevent the horse from running; for, if he attempts to raise both feet at once, he will fall upon his knees, and his progress arrested. If, on the other hand, he confines his gait to a trot, his motion will not be impeded; as, when one foot is thrown back nearly under the pulley $n$, it will shorten that end of strap and lengthen the opposite end, so that the leg which is in advance will be unobstructed in its action. In order large to prevent the horse from kicking, the following devices are used: On the top of back-band $o$ is secured a iron ring, to which the four straps $q$ $r$ U and V are attached. The lower end of $q$ is formed with a loop to fit in a ring fastened to the upper side of the shaft. The strap $q$ can be lengthened, at pleasure, by means of a buckle on it. Strap $r$ is fastened to a leather thong, one end of said thong being secured to the ring, which connects the strap $r$ and breech-band H together. The strap U is fastened at its lower end by a loop to a ring on the shaft B. The strap V is made to pass down under horse, and secured to the belly-band, and is crossed by the corresponding strap V from the opposite side of the horse. It will be seen from the arrangement of these straps, and their pressure on the rump of the horse, that it will be impossible to make any attempt at kicking.

To carry my plan of breaking horses into successful operation, I fasten a well-broken horse to single-tree W, fig. 4, and secure the reins of his bridle to the rod T, which is confined to the shaft by two staples. $a$ represents a neck-yoke, which is pivoted to a ring on the left-hand shaft, and extends sufficiently far beyond the right-hand shaft to be attached by a strap to the collar of the off horse. In order to prevent the restive horse in the shafts from backing, when the whip is applied, to make him advance, the two bars Y are hinged to the axle-tree, and their lower ends furnished with iron spikes for entering the ground. These spikes are hinged at the end of the bars Y, and can be folded back, when required. In breaking a restive or stubborn horse, he will be placed in the shafts, and a gentle animal hitched to the off side, as above described. When the restive horse is sufficiently subdued, he will be hitched on the off side, and the gentle horse placed in the shafts. This plan will be pursued until the vicious animal is completely conquered. He can then be worked in the ordinary way.

Having thus described my invention, what I claim, and desire to secure by Letters Patent, is—

The kicking-straps $q$ $r$ U and V, the strap P, the rod T, the neck-yoke $a$, and the bars Y, the whole arranged, constructed, and operated substantially as herein described.

In testimony that I claim the foregoing as my own I hereby affix my signature in the presence of two witnesses.

COMMODORE DANIELS.

Witnesses:
E. F. DICKINSON,
JOHN E. REARICK.